(12) United States Patent
Xu et al.

(10) Patent No.: US 11,888,224 B2
(45) Date of Patent: Jan. 30, 2024

(54) HIGH-GAIN AND LOW-RCS BROADBAND CIRCULARLY POLARIZED METASURFACE ANTENNA BASED ON NOVEL SEQUENTIAL-ROTATION FEEDING NETWORK

(71) Applicant: Nanjing University of Posts and Telecommunications, Jiangsu (CN)

(72) Inventors: Feng Xu, Jiangsu (CN); Xiaofei Zhao, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 0 days.

(21) Appl. No.: 18/008,182

(22) PCT Filed: Aug. 5, 2022

(86) PCT No.: PCT/CN2022/110444
§ 371 (c)(1),
(2) Date: Dec. 5, 2022

(87) PCT Pub. No.: WO2022/262876
PCT Pub. Date: Dec. 22, 2022

(65) Prior Publication Data
US 2023/0268660 A1   Aug. 24, 2023

(30) Foreign Application Priority Data

Jun. 15, 2021 (CN) .......................... 202110663270.0

(51) Int. Cl.
*H01Q 15/00* (2006.01)
*H01Q 3/30* (2006.01)
*H01Q 21/00* (2006.01)

(52) U.S. Cl.
CPC .......... *H01Q 15/0026* (2013.01); *H01Q 3/30* (2013.01); *H01Q 15/0086* (2013.01); *H01Q 21/0075* (2013.01)

(58) Field of Classification Search
CPC .......... H01Q 15/0026; H01Q 15/0086; H01Q 3/30; H01Q 21/0075
See application file for complete search history.

(56) References Cited

U.S. PATENT DOCUMENTS 5,661,494 A     8/1997  Bondyopadhyay
11,189,933 B2 * 11/2021 Wu ........................ H01Q 21/12
(Continued)

FOREIGN PATENT DOCUMENTS

CN   104852158   8/2015
CN   105870623   8/2016
(Continued)

OTHER PUBLICATIONS

He Yan et al., "Compact dual-band circularly polarized microstrip patch array", Journal of National University of Defense Technology, Dec. 2016, submit with English abstract, pp. 186-190.
(Continued)

*Primary Examiner* — Awat M Salih
(74) *Attorney, Agent, or Firm* — JCIPRNET

(57) ABSTRACT

A high-gain and low-RCS (radar cross section) broadband circularly polarized metasurface antenna based on a novel sequential-rotation feeding network includes three layers of dielectric substrates and five metal layers as well as three resistors, which are from top to bottom: a first metal layer, a first dielectric substrate, a second metal layer, a second dielectric substrate, a third metal layer, a fourth metal layer, a third dielectric substrate and a fifth metal layer. The first three metal layers are all metasurface arrays composed of 10*10 metal patches; the fourth metal layer and the third
(Continued)

metal layer define a resonant cavity by means of a distance therebetween; the fourth metal layer is provided with four slits having rotational symmetry; and the fifth metal layer is a hybrid feeding network composed of microstrip lines and including three equal power dividers and three resistors.

8 Claims, 7 Drawing Sheets

(56) References Cited

U.S. PATENT DOCUMENTS

| | | | |
|---|---|---|---|
| 2011/0128201 A1 | 6/2011 | Ju | |
| 2014/0313090 A1* | 10/2014 | Oh | H01Q 15/0026 343/753 |

FOREIGN PATENT DOCUMENTS

| | | |
|---|---|---|
| CN | 106816716 | 6/2017 |
| CN | 107834176 | 3/2018 |
| CN | 111430891 | 7/2020 |
| CN | 112615148 | 4/2021 |

OTHER PUBLICATIONS

Yin Jiliang, "Design of Ku-band wide-angle scanning circularly polarized microstrip" Electronic Components and Materials, May 2017, submit with English abstract, pp. 81-84.

"International Search Report (Form PCT/ISA/210) of PCT/CN2022/110444," dated Sep. 26, 2022, pp. 1-4.

"Written Opinion of the International Searching Authority (Form PCT/ISA/237) of PCT/CN2022/110444," dated Sep. 26, 2022, with English translation thereof, pp. 1-8.

* cited by examiner

HIGH-GAIN AND LOW-RCS BROADBAND CIRCULARLY POLARIZED METASURFACE ANTENNA BASED ON NOVEL SEQUENTIAL-ROTATION FEEDING NETWORK

CROSS-REFERENCE TO RELATED APPLICATION

This application is a 371 of international application of PCT application serial no. PCT/CN2022/110444, filed on Aug. 5, 2022, which claims the priority benefit of China application no. 202110663270.0, filed on Jun. 15, 2021. The entirety of each of the above mentioned patent applications is hereby incorporated by reference herein and made a part of this specification.

TECHNICAL FIELD

The present invention belongs to the field of microwave antennas, and specifically relates to a high-gain and low-RCS (radar cross section) broadband circularly polarized metasurface antenna based on a novel sequential-rotation feeding network.

BACKGROUND

One of the largest application fields of antennas is radar. In the early days, in order to prevent radar from being discovered, a radome is usually specially designed to reduce the detected intensity, namely, to reduce a radar cross section (RCS). At present, an increasing number of arrays can realize a low RCS at the time of radiation, the research of which is very necessary.

Signal fading in wireless communication can be explained using a multipath effect. A linearly polarized antenna is very poor in resisting interference and has high requirements on the polarization of a receiving antenna, while circularly polarized waves have a very strong ability in resisting the multipath effect and can reach a receiving efficiency of 50% even for a linearly polarized receiving antenna. Therefore, circularly polarized antennas are of a great research value in ground-to-air communications.

The research of broadband antennas is more important due to increasing use of electromagnetic wave bands and increasing amount of communication data. Metasurface has been shown to be a broadband antenna, but the research of broadband circular polarization is very rare in the research of circularly polarized metasurface antennas, which results in a low utilization rate of the antennas. Therefore, it is very necessary to further investigate the bandwidth of circularly polarized antennas.

SUMMARY

In order to solve the technical problem mentioned in the background, the present invention employs a high-gain and low-RCS broadband circularly polarized metasurface antenna based on a novel sequential-rotation feeding network, which not only greatly expands the bandwidth of circular polarization and increase the utilization rate of the antenna bandwidth, but also has the characteristics of low RCS, high gain and miniaturization.

The purpose of the present invention will be achieved through the following technical solution:

A high-gain and low-RCS broadband circularly polarized metasurface antenna based on a novel sequential-rotation feeding network, comprising a first metal layer, a first dielectric substrate, a second metal layer, a second dielectric substrate, a third metal layer, a fourth metal layer, a third dielectric substrate and a fifth metal layer, disposed sequentially from top to bottom, where the structures of the first metal layer and the third metal layer are both composed of a 2*2 large array, each large array being composed of 5*5 rectangular metal sheets inclining for 45 degrees and each provided with four metal strips, all four sides of each metal sheet being grooved and having a metal branch 42 introduced in to form a square metal unit, thereby constituting a large array of square metals, the large arrays having rotational symmetry with each other around a center;

the second metal layer is a 10*10 square metal array, having a cycle equal to those of the first metal layer and the third metal layer, and each unit being a square metal ring;

the fourth metal layer is a whole piece of metal with four slits dug out, the four slits having rotational symmetry with each other;

a certain distance exists between the third metal layer and the fourth metal layer to define a resonant cavity so that electromagnetic waves are positively superposed in the distance to increase the gain of radiation; and the fifth metal layer is a hybrid sequential-rotation feeding network consisting of microstrip lines, the microstrip line at an input end being divided into two ports by an equal power divider, where one of the ports is connected to a C-type microstrip coupled line and then further divided into two paths by an equal power divider, the two paths consisting of C-type coupled lines 62 and having a fixed phase difference, and the other one of the ports is connected to a delay line 61 and then to the same structure, the delay line 61 having a fixed phase difference.

Further, the number of and the spacing between the square metals in the first, second and third metal layers are determined according to designed indexes.

Further, the distance between the third metal layer and the fourth metal layer is determined according to a designed frequency, namely, an operating frequency of the antenna, and a metasurface.

Further, the microstrip lines and the ports both have an impedance of about 50 Ohm.

Further, an index of the C-type coupled line 62 is decided by a phase in design requirements.

Further, the delay line 61 has a phase of 180 degrees.

Further, in the fourth metal layer, the phase difference between the two paths consisting of the C-type coupled lines is fixed at 90 degrees.

Further, the hybrid sequential-rotation feeding network divides a port into four ports designed with phase differences of 0 degrees, 90 degrees, 180 degrees and 270 degrees with each other, where the phase differences are broadband so as to enhance a circularly polarized bandwidth.

Compared with the prior art, the present invention adopting the abovementioned technical solution has the following technical effects: first, compared with a microstrip phase shifter consisting of common delay lines, the present invention uses a broadband phase-shift network which is important in guaranteeing broadband circular polarization; second, compared with a conventional sequential-rotation network, the whole sequential-rotation phase is broadband; and last, the broadband sequential-rotation phase-shift network is combined with a metasurface antenna for the first time, so that the broadband sequential-rotation phase-shift network enables broader circularly polarized bandwidth, which can significantly improve the utilization rate of the bandwidth of the metasurface antenna and solve the problem mentioned in the background.

DETAILED DESCRIPTION OF THE INVENTION

The technical solution of the present invention is further described in detail below with reference to the drawings of the specification.

Figure 1:
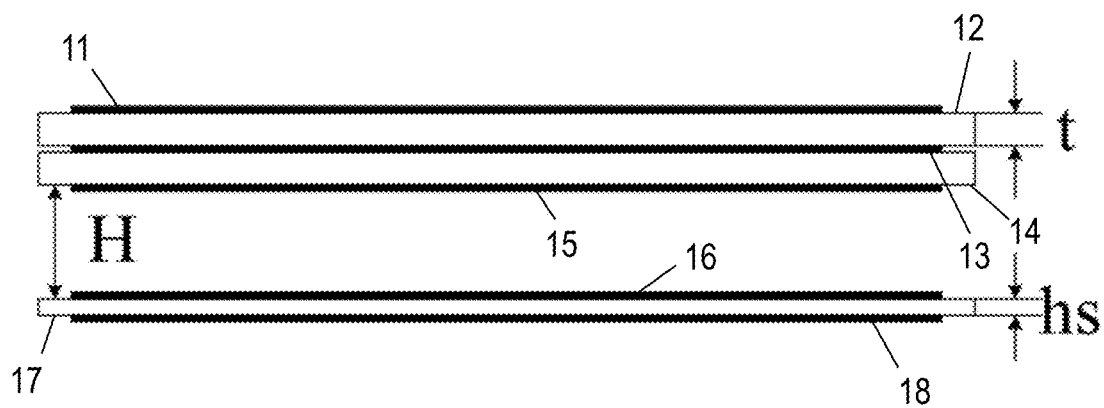
FIG. 1 is a side view of an antenna according to an embodiment of the present invention.
Figure 2:
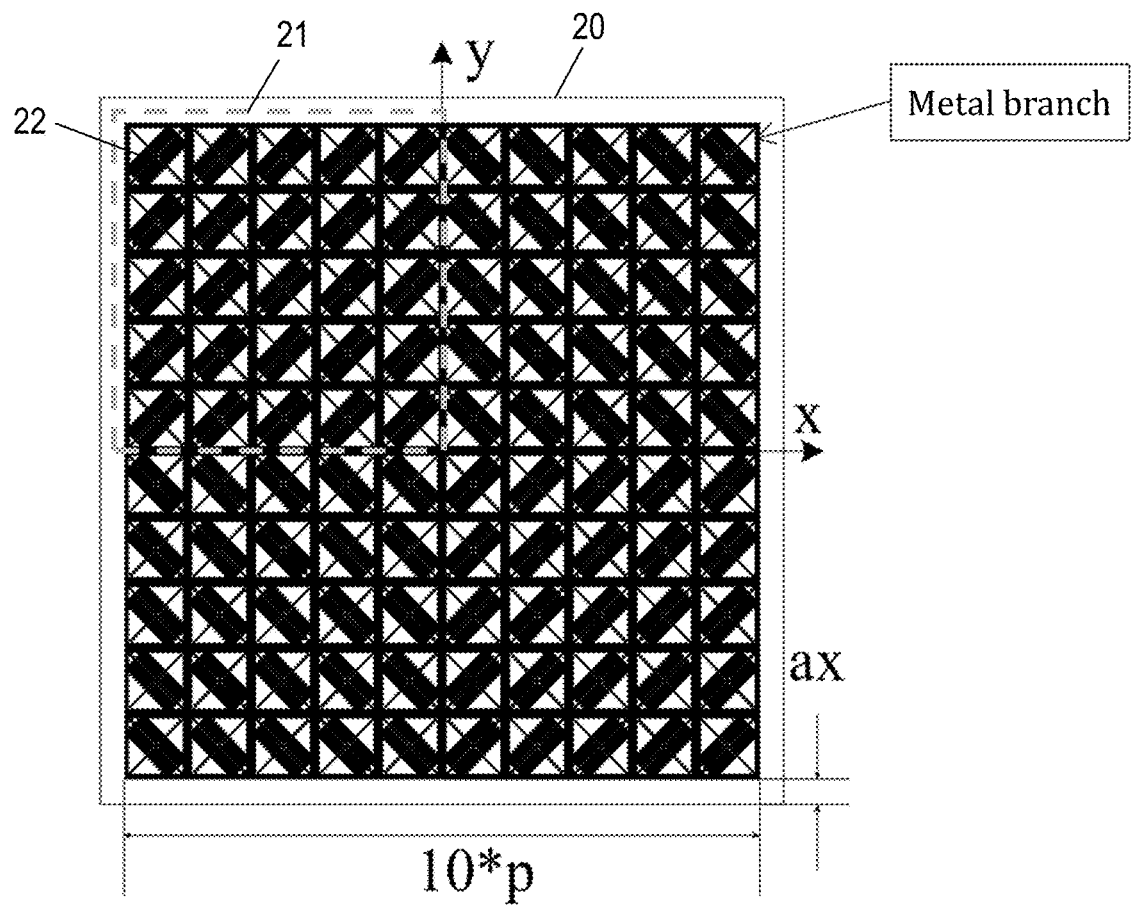
FIG. 2 is a schematic diagram of first and third metal layers, namely, the metasurface positions, according to the embodiment of the present invention.
Figure 3:
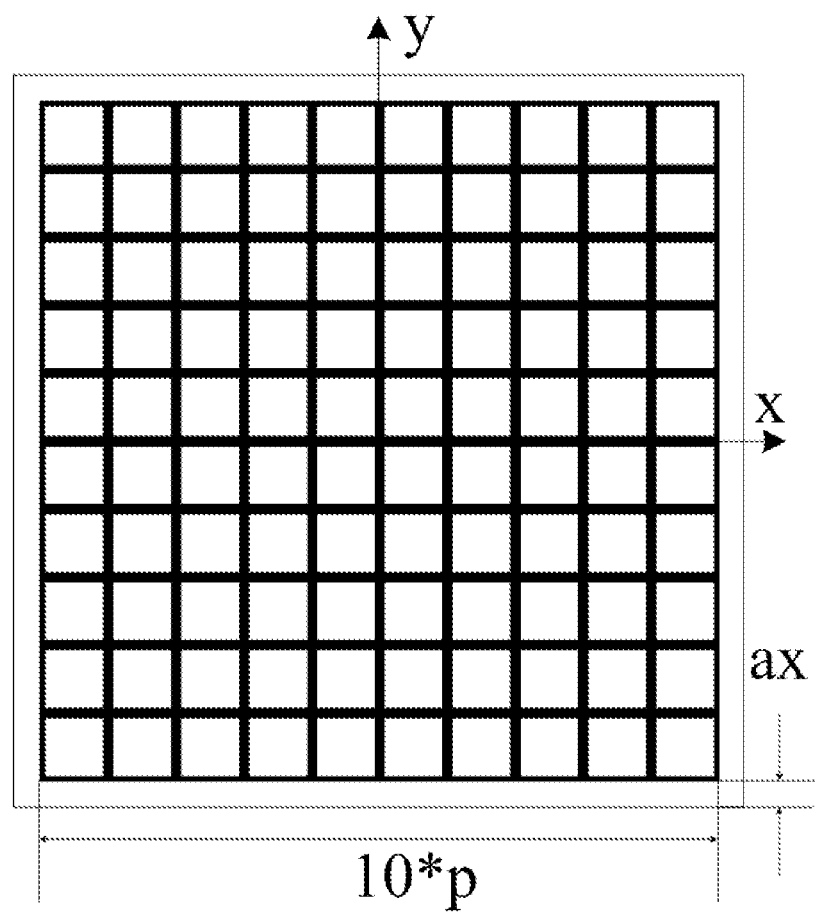
FIG. 3 is a schematic diagram of a second metal layer according to the embodiment of the present invention.
Figure 4:
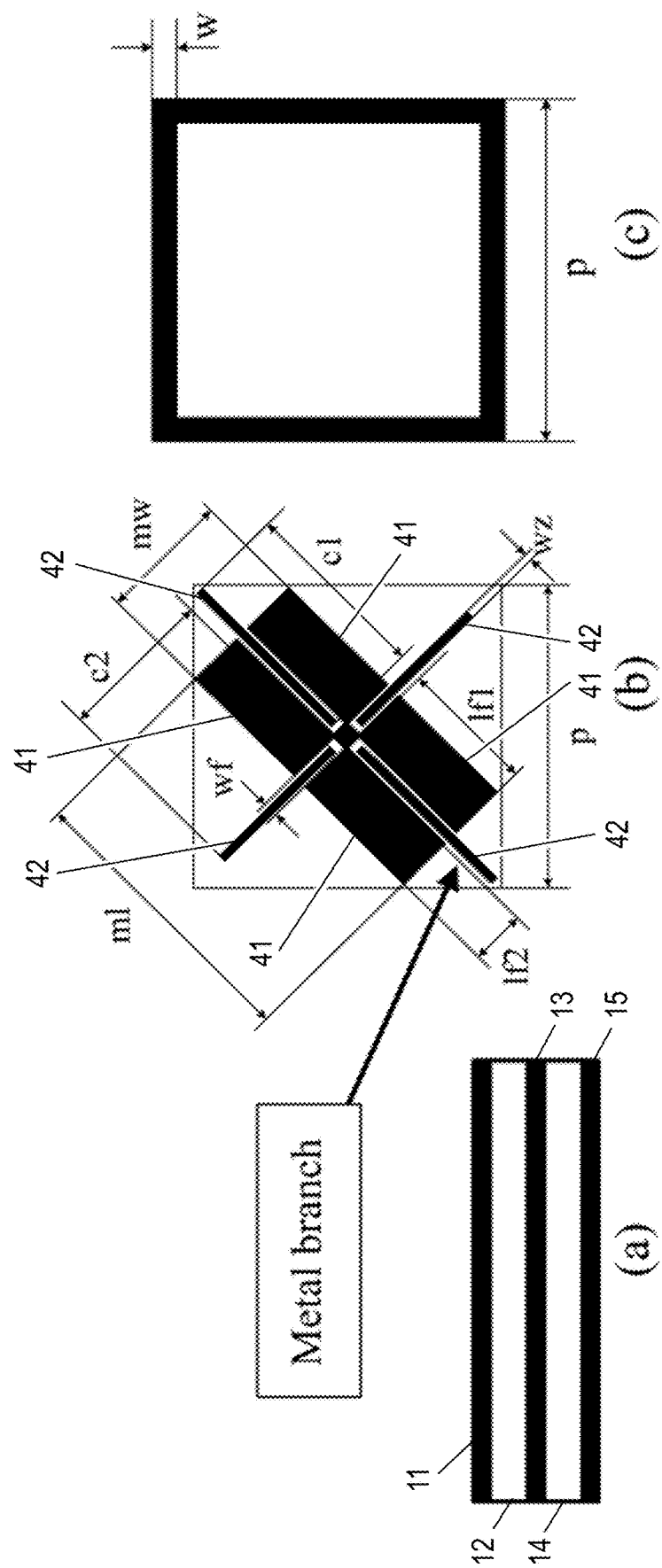
FIG. 4 is a structural schematic diagram of array elements of the first, second and third metal layers according to the embodiment of the present invention.
Figure 5:
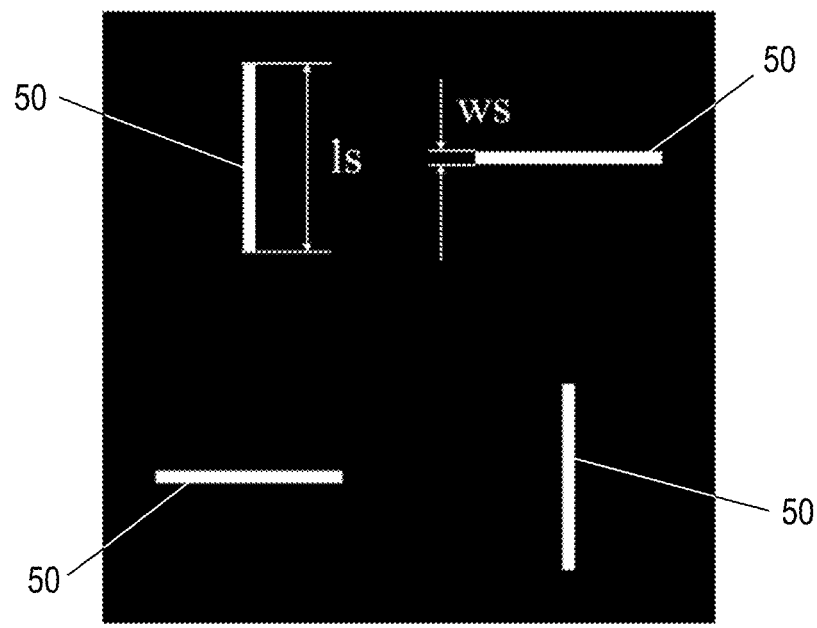
FIG. 5 is a structural schematic diagram of a fourth metal layer according to the embodiment of the present invention.
Figure 6:
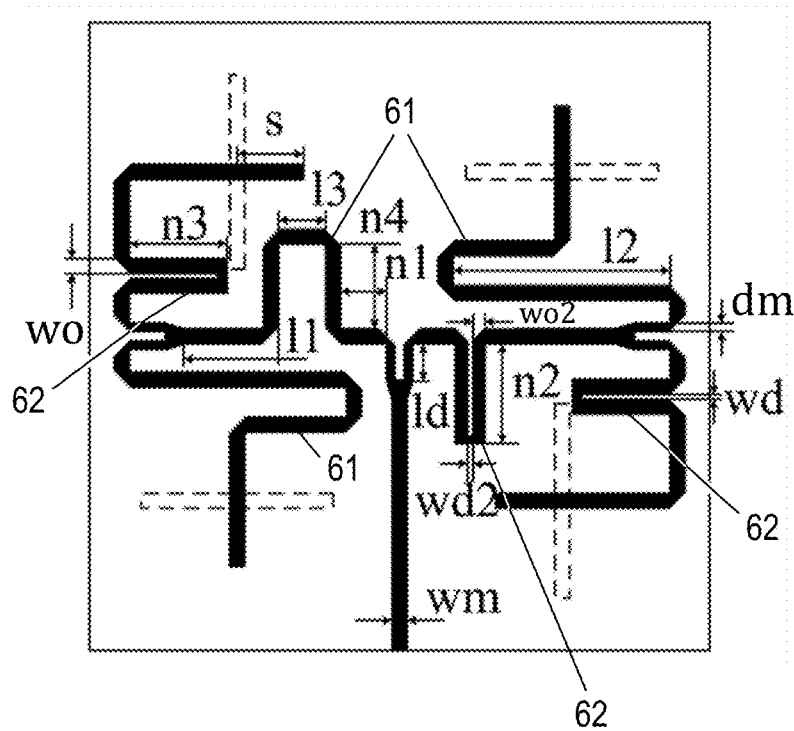
FIG. 6 is a structural schematic diagram of a fifth metal layer, namely, a novel rotation feeding network, according to the embodiment of the present invention.

The present invention provides a high-gain and low-RCS broadband circularly polarized metasurface antenna based on a novel sequential-rotation feeding network. The structure of the antenna is illustrated in FIG. 1 to FIG. 6, and the simulation and measurement results are drawn in FIG. 7 to FIG. 10. FIG. 1 is a side view of the structure, which clearly shows the relative positions of three layers of dielectric substrates (e.g., dielectric substrates 12, 14, and 17) and five metal layers (e.g., metal layers 11, 13, 15, 16, and 18) and reflects a distance between a fourth metal layer and a third metal layer. The dielectric substrates are all Rogers 4003C, having a relative dielectric constant of 3.55; between a first layer and a second layer is a dielectric with a height of t, between the second layer and the third layer is a dielectric with a height of t, between the third layer and the fourth layer is air with a height of H, and between the fourth layer and a fifth layer is a dielectric with a height of hs. FIG. 2 illustrates the structure of the first and third metal layer and shows an arrangement of metasurface array elements consisting of rectangular metal sheets in a top view, wherein the structure 20 includes 2*2 large arrays (e.g., large array 21) and large array 21 includes 5*5 rectangular metal sheets (e.g., rectangular metal sheet 22). FIG. 3 shows a structure of a second metal layer. FIG. 4 (a) illustrates an array element composed of the upper two dielectric layers and three metal layers, the first metal layer and the third metal layer having the same structure, as square metal unit shown in FIG. 4 (b), where four metal strips 41 are introduced in the metal unit on the basis of a rectangle, which can reduce the operating frequency of the unit and thus reduce the electrical size; and FIG. 4 (c) illustrates a unit structure of the second metal layer, each unit being a square metal ring. FIG. 5 illustrates the fourth metal layer, with four slits 50 having rotational symmetry around a center being dug out in the whole metal to feed a metasurface array, which is equivalent to a source antenna of the metasurface array. FIG. 6 illustrates the fifth metal layer, a sequential-rotation broadband feeding network, which supplies feeding with a certain phase difference to the four slits in the fourth layer so that the excited metasurface array radiates circularly polarized waves.

Parameter values in the embodiment: $m1=5.6$ mm, $mw=2.4$ mm, $c1=4$ mm, $c2=3.8$ mm, $lf1=2.6$ mm, $112=1$ mm, $wf=0.3$ mm, $wz=0.2$ mm, $p=5.8$ mm, $t=1.524$ mm, $wo=0.98$ mm, $wd=0.24$ mm, $s=8.8$ mm, $w=0.5$ mm, $H=15$ mm, $hs=0.508$ mm, $ax=5.6$ mm (this part denotes redundant dielectric substrates for fixation of a multi-layer substrate), $is=22$ mm, $ws=1.5$ mm, $wm=1.1$ mm, $ld=4.4$ mm, $n1=2.7$ mm, $n2=11.2$ mm, $n3=11.1$ mm, $n4=8.1$ mm, $l1=11.2$ mm, $l2=20.1$ mm, $l3=2.6$ mm, $dm=0.62$ mm, $wd2=0.035$ mm and $wo2=0.56$ mm.

Figure 7:
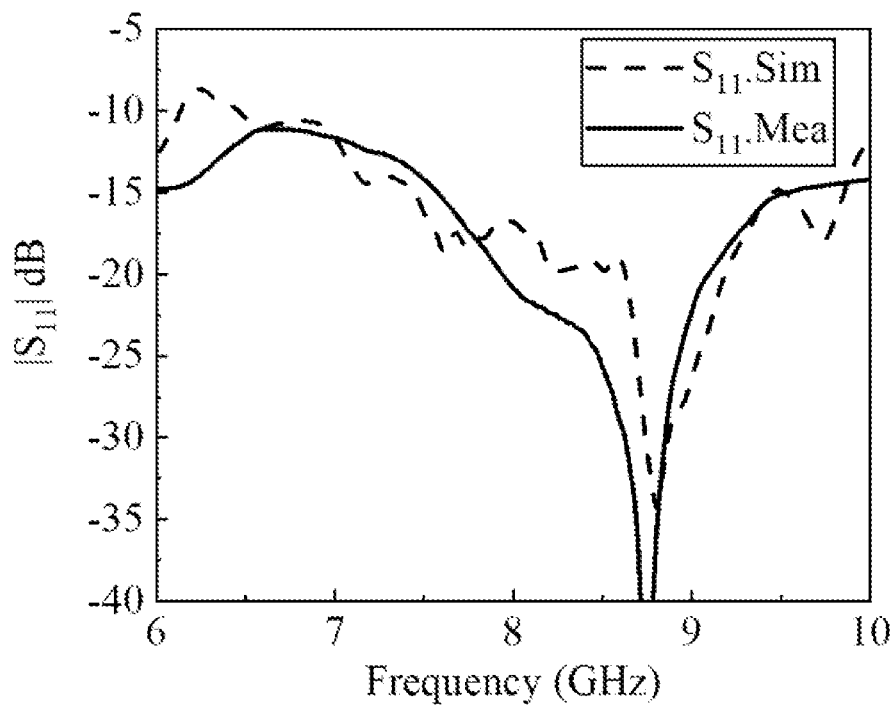
FIG. 7 shows simulated and measured S-parameter graphs according to the embodiment of the present invention.
Figure 8:
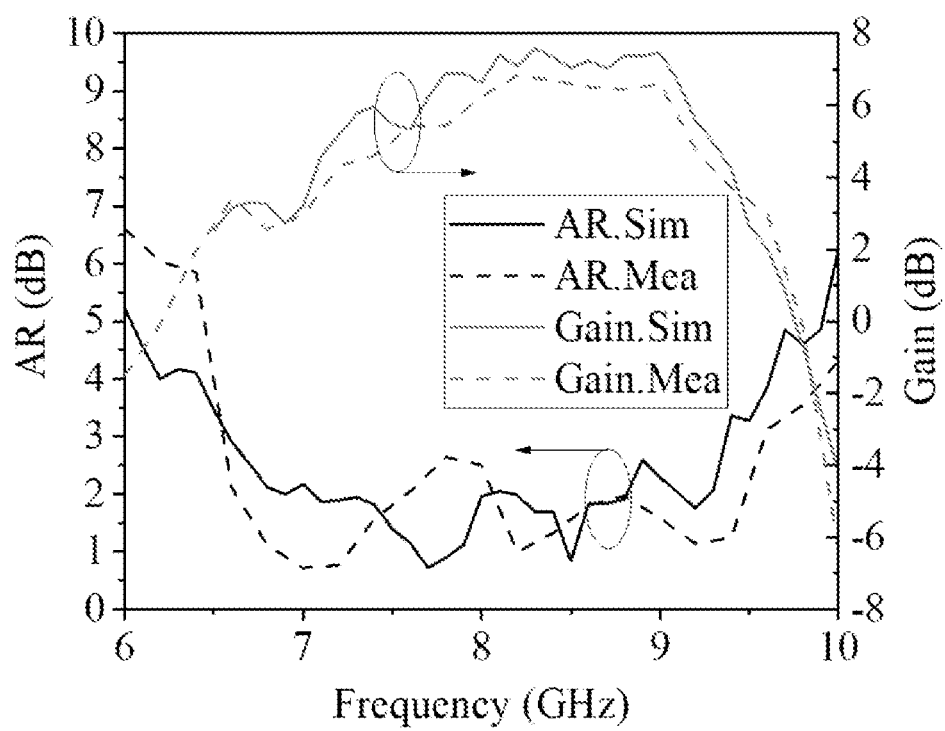
FIG. 8 shows simulated and measured axial ratio graphs and gain graphs according to the embodiment of the present invention.
Figure 9:
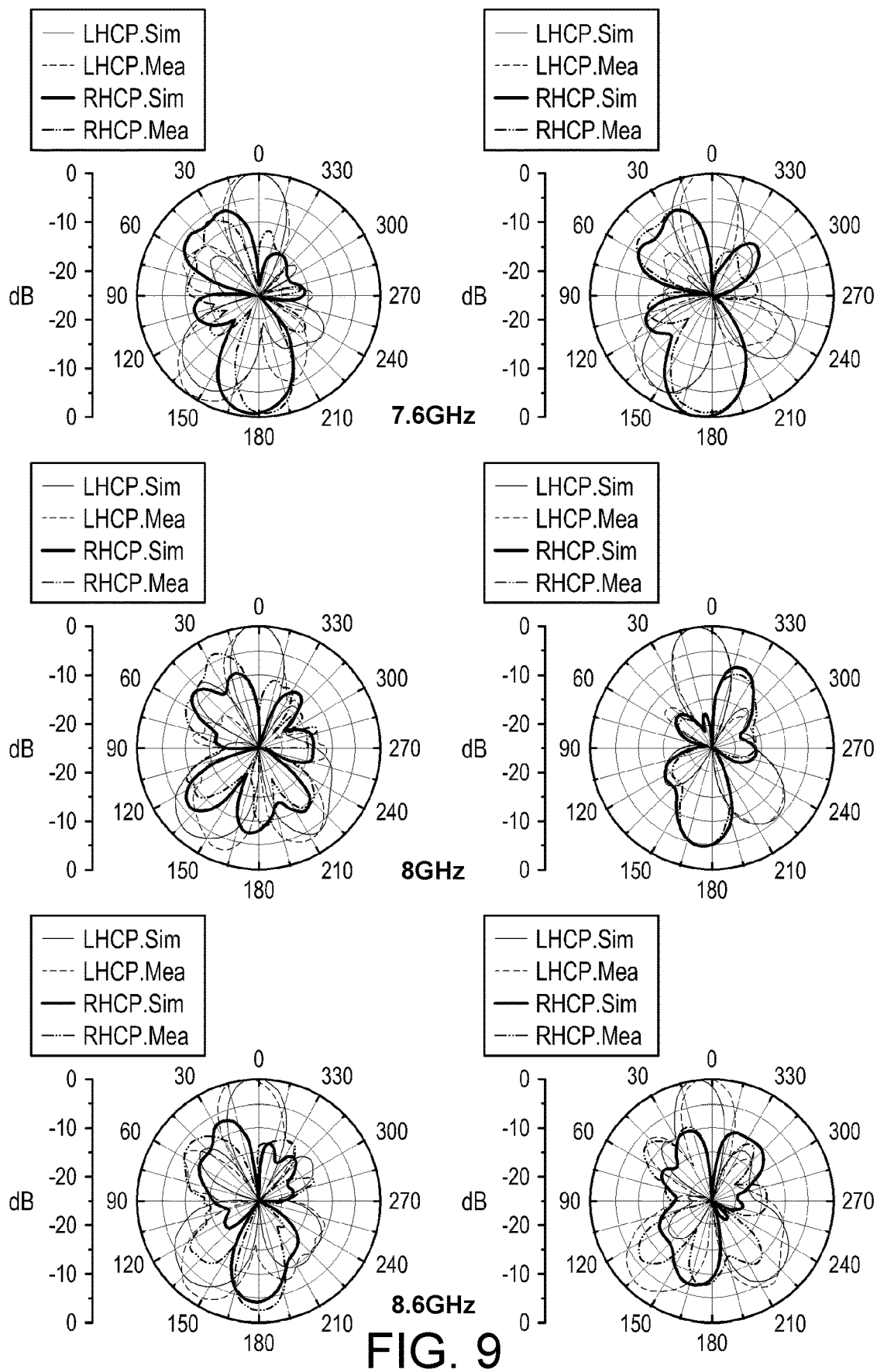
FIG. 9 shows simulated and measured directional diagrams according to the embodiment of the present invention.
Figure 10:
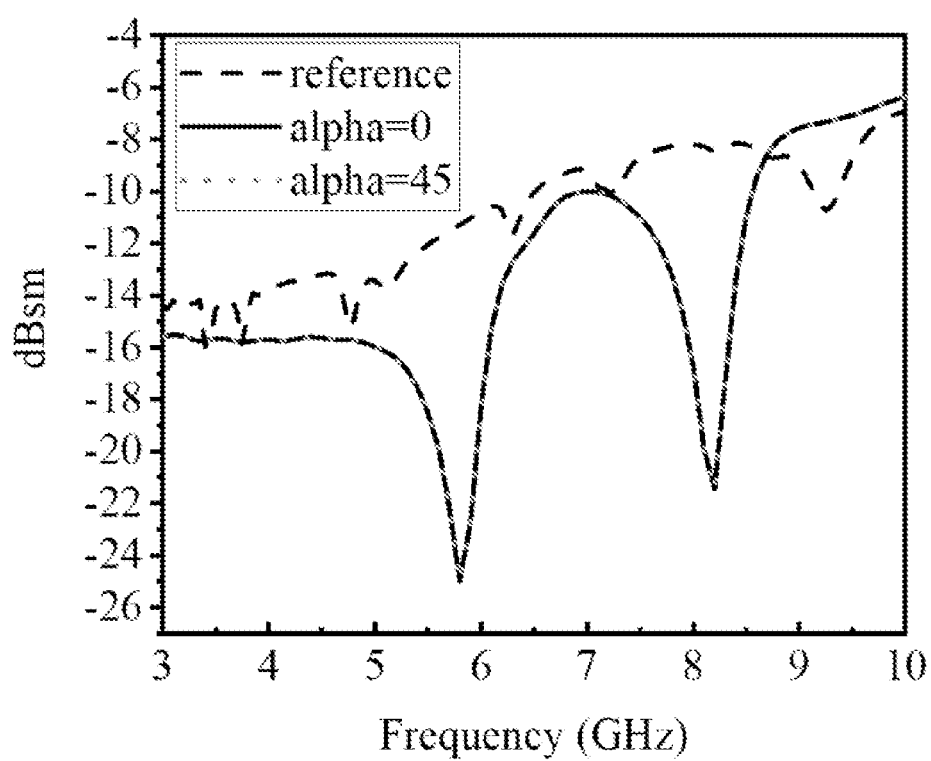
FIG. 10 illustrates simulation results of a RCS according to the embodiment of the present invention.

The simulation and measurement results of the embodiment are shown in FIG. 7 and FIG. 10, where the axial ratio in a range between 6.5 GHz and 9.55 GHz is less than 3 dB, the gain maximum is 7.1 dB, and the 3-dB gain drop bandwidth is 7.5 GHz to 9 GHz. According to the experience of taking the smallest bandwidth, the final circularly polarized bandwidth is 6.5 GHz to 9.55 GHz, namely, 38%. According to the data of specific structural parameters given above, an electrical size of the metasurface array is calculated to be $1.54\lambda*1.54\lambda$, namely, $2.37\lambda^2$. Three frequency points, 7 GHz, 8 GHz and 9 GHz, are taken evenly within the bandwidth to examine the two-dimensional directional diagrams of two orthogonal sections. It can be seen that co-polarization of the antenna is left-handed circular polarization (LHCP) while cross polarization is right-handed circular polarization (RHCP). It can be inferred from the directional diagrams of the three frequency points that, in the whole operating frequency range, a co-polarization to cross polarization ratio of the antenna is greater than 20 dB, a front-to-back ratio is greater than 15 dB, the radiation characteristics have excellent circular polarization purity and directionality. FIG. 10 is an RCS simulation graph, where the RCS is simulated at two angles, with an unloaded metasurface as a reference. It can be seen that the RCS is significantly weakened at 4 GHz to 9 GHz, and weakened by 13 dB at most.

The description above is merely preferred implementation modes of the present invention, and the scope of protection of the present invention is not limited thereto. Any equivalent modification or variations made by those of ordinary skill in the art according to the contents disclosed in the present invention shall be included in the scope of protection described in the claims.

The invention claimed is:

1. A high-gain and low-radar cross section (RCS) broadband circularly polarized metasurface antenna based on a novel sequential-rotation feeding network, comprising a first metal layer, a first dielectric substrate, a second metal layer, a second dielectric substrate, a third metal layer, a fourth metal layer, a third dielectric substrate and a fifth metal layer, disposed sequentially from top to bottom, wherein structures of the first metal layer and the third metal layer are both composed of 2*2 large arrays, each of the large arrays being composed of 5*5 rectangular metal sheets inclining for 45 degrees and each provided with four metal strips, four sides of each of the metal sheets being grooved and having a metal branch introduced in to form a square metal unit, thereby constituting a large array of square metals, the large arrays having rotational symmetry with each other around a center;

the second metal layer is a 10*10 square metal array, having a cycle equal to those of the first metal layer and the third metal layer, and each unit being a square metal ring;

the fourth metal layer is a whole piece of metal with four slits dug out, the four slits having rotational symmetry with each other;

a certain distance exists between the third metal layer and the fourth metal layer to define a resonant cavity so that electromagnetic waves are positively superposed in the distance to increase gain of radiation; and the fifth metal layer is a hybrid sequential-rotation feeding network consisting of microstrip lines, the microstrip line at an input end being divided into two ports by an equal power divider and a resistor, wherein one of the ports is connected to a C-type microstrip coupled line and then further divided into two paths by an equal power divider and a resistor, the two paths consisting of C-type coupled lines and having a fixed phase difference, and the other one of the ports is connected to a delay line and then to the same structure, the delay line having a fixed phase difference.

2. The high-gain and low-RCS broadband circularly polarized metasurface antenna based on a novel sequential-rotation feeding network according to claim 1, wherein the number of and spacings between the square metals in the first, the second and the third metal layers are determined according to designed indexes.

3. The high-gain and low-RCS broadband circularly polarized metasurface antenna based on a novel sequential-rotation feeding network according to claim 1, wherein the distance between the third metal layer and the fourth metal layer is determined according to a designed frequency and a metasurface.

4. The high-gain and low-RCS broadband circularly polarized metasurface antenna based on a novel sequential-rotation feeding network according to claim 1, wherein the microstrip lines and the ports both have an impedance of 50 Ohm.

5. The high-gain and low-RCS broadband circularly polarized metasurface antenna based on a novel sequential-rotation feeding network according to claim 1, wherein an index of the C-type coupled line is decided by a phase in design requirements.

6. The high-gain and low-RCS broadband circularly polarized metasurface antenna based on a novel sequential-rotation feeding network according to claim 1, wherein the delay line has a phase of 180 degrees.

7. The high-gain and low-RCS broadband circularly polarized metasurface antenna based on a novel sequential-rotation feeding network according to claim 1, wherein, in the fourth metal layer, the phase difference between the two paths consisting of the C-type coupled lines is fixed at 90 degrees.

8. The high-gain and low-RCS broadband circularly polarized metasurface antenna based on a novel sequential-rotation feeding network according to claim 1, wherein the hybrid sequential-rotation feeding network divides a port into four ports designed with phase differences of 0 degrees, 90 degrees, 180 degrees and 270 degrees with each other, wherein the phase differences are broadband so as to enhance a circularly polarized bandwidth.

\* \* \* \* \*